UNITED STATES PATENT OFFICE.

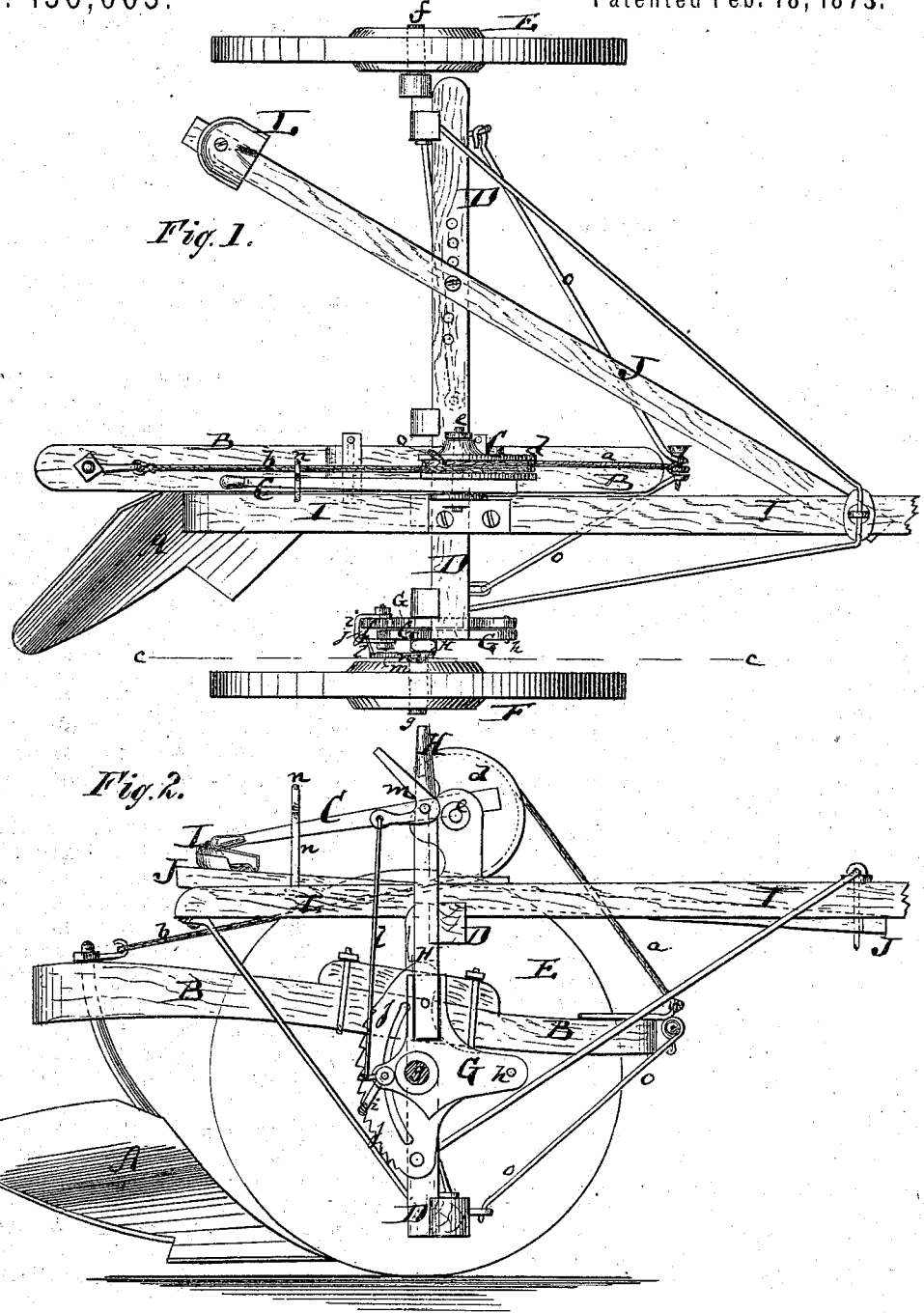

WILLIAM OUGH, OF ORION, ILLINOIS.

IMPROVEMENT IN SULKY-PLOWS.

Specification forming part of Letters Patent No. 136,003, dated February 18, 1873.

*To all whom it may concern:*

Be it known that I, WILLIAM OUGH, of Orion, in the county of Henry and State of Illinois, have invented a new and Improved Sulky-Plow, of which the following is a specification:

Figure 1 represents a top view of my improved sulky-plow. Fig. 2 is a vertical section of the same on the line *c c*, Fig. 1.

Similar letters of reference indicate corresponding parts.

The invention consists in the means hereinafter described for raising, lowering, and holding the frame which sustains the plows, and thereby graduating the depth of furrow which is to be cut by the latter.

A in the drawing represents the plow-share, of suitable shape and kind. B is the plow-beam, to which the share A is fastened in suitable manner. The ends of the beam B are, by cords or chains *a* and *b*, respectively, connected with a segment, *d*, which forms part of a lever, C, and is pivoted at *e* to the frame D of the sulky. This frame is supported by the wheels E and F. One of these wheels, E, is hung to a pin, *f*, that projects rigidly from one end of the frame D. The other wheel, F, is hung on a pin, *g*, that projects from a plate, G, which is pivoted at *h* to the frame D. A lever, H, connected with the plate G, serves to swing it on its pivot *h*, so as to raise or lower the end of the frame D, which is supported by the wheel F, and thereby to set the plow to a greater or less depth in the ground. The device can thus be used in almost every kind of soil. The plate G can be locked in every desired position by a link-connection, *i*, on a toothed segment, *j*, that projects from the frame D. The link *i* can, by means of a rod, *l*, and bell-crank *m*, be raised out of the notches of *j* whenever the plate G is to be unlocked and vibrated, the bell-crank being pivoted to the upper part of the lever H within convenient reach of the driver.

The lever C, when swung on its pivot *e*, serves to raise the plow out of the ground or lower it into position for operation, but does not graduate the depth to which the plow works, which is done by the lever H and its appendages. A catch, *n*, serves to hold the lever C down when it is swung back, as in Fig. 2, for raising the plow-beam. By connecting both ends of the plow-beam with the lever C it is raised and lowered in a level position, or nearly so, moving the plow up and down, which is the easiest way, much easier than drawing it diagonally through the soil, as is usually done.

The tongue I is rigidly fastened to the frame D, and is braced thereon by a diagonal beam, J, as shown in Fig. 1. The driver's seat L is fastened on the end of the beam J. In this position the driver is enabled to move the levers C and H with his feet, if necessary. The front end of the beam B may, if desired, be steadied by connection by jointed wire braces, *o o*, with the ends of the frame D.

Having thus described my invention, I claim as new and desire to secure by Letters Patent—

The plate G, pivoted to plow-frame D, receiving-wheel on a pin, *g*, and provided with a lever, H, in combination with arc-slotted and notched plate *j*, and lock mechanism *i l m*, substantially as and for the purpose described.

WILLIAM OUGH.

Witnesses:
 HENRY OUGH,
 GEO. W. OUGH.